United States Patent [19]
Timms

[11] 3,742,711
[45] July 3, 1973

[54] MODULATABLE THRUST NOZZLE APPARATUS

[75] Inventor: Richard H. Timms, San Diego, Calif.

[73] Assignee: Rohr Industries, Inc., Chula Vista, Calif.

[22] Filed: Feb. 7, 1972

[21] Appl. No.: 224,125

[52] U.S. Cl. .............. 60/226, 60/264, 239/265.17
[51] Int. Cl. .......................... F02k 3/04, F02k 1/02
[58] Field of Search .................... 60/226 R, 264; 239/127.3, 265.17

[56] References Cited
UNITED STATES PATENTS
3,579,993  5/1971  Tanner ........................... 239/127.3
3,662,556  5/1972  Poucher ........................... 60/226 R Primary Examiner—Douglas Hart
Attorney—George E. Pearson

[57] ABSTRACT

Fan jet engine has cowl surrounding engine and terminating in jet exhaust nozzle. Elongate shroud surrounds fan and engine to define annular passage for fan air and terminates forward of exit end of exhaust nozzle. Aft portion of shroud is separate sleeve movable axially rearward to define peripheral gap for inflow of free stream air to add to mass delivered by fan. Engine cowl converges rearwardly from transverse plane of aft end of sleeve. When sleeve is stowed it defines with the cowl a convergent nozzle of minimum discharge area. When it is fully deployed, it forms with the cowl a divergent nozzle of maximum discharge area conformed to produce optimum thrust for takeoff.

8 Claims, 2 Drawing Figures

MODULATABLE THRUST NOZZLE APPARATUS

BACKGROUND OF THE INVENTION

This invention lies in the field of gas turbine engines, commonly called jet engines, which produce reaction thrust by ejecting a high velocity stream of gas from the exhaust nozzle of the gas turbine. A modified form of such engine, commonly referred to as a fan jet, incorporates a nacelle or shroud surrounding and spaced from the engine and its cowl to form a passage for the rearward flow of air from the radially outer portion of the compressor or fan which also supplies combustion air to the turbine. In this type, the major portion of the total thrust is provided by the air stream delivered by the fan to the passage or duct. The invention is directed to this type of engine and particularly to means for modulating the air flow to obtain optimum thrust and efficiency.

It is well known that the total thrust and the thrust efficiency of any given jet engine installation depend upon very careful design of the thrust nozzle, and that the configuration or profile of the nozzle must vary for different flight regimes. So-called variable area nozzles have been used for this purpose for years and have taken many different forms. Conventional jet engines have used center bodies aft of the turbine and axially movable within the nozzle or radially expansible and contractible, or nozzle walls which are expansible and contractible at their trailing edges, or combinations of these. Fan type engines have also used variations of the above which were suitable for their construction. Most of these have achieved the desired result but have suffered the disadvantage of a multiplicity of mechanical parts which must work reliably at all times but which are subject to wear and damage, resulting in high first cost and maintenance expense.

SUMMARY OF THE INVENTION

The present invention provides apparatus which is particularly applicable to fan jet engines. It accomplishes the function of varying the discharge area of the fan air duct and also of changing a convergent nozzle profile to a convergent-divergent nozzle profile with a construction which involves a minimum number of moving parts, is very light and simple, and needs very little maintenance.

Generally stated, it is necessary only to modify a conventional shroud to make a part of it movable and to provide mechanism to move the part to selected positions. A conventional fan jet installation normally includes a jet engine enclosed in a core cowl with a compressor or fan mounted at the forward end of the engine shaft, the fan being of sufficient size to supply air to the turbine for combustion and a rearward flow of air around the cowl to produce a major part of the total thrust. The engine and fan are surrounded by an elongate shroud radially spaced from the cowl to define a generally annular passage or duct for the rearward flow of propulsion air delivered by the fan. The shroud terminates forward of the trailing edge of the cowl in a transverse plane defining a propulsion air exit nozzle.

In presently preferred form of the invention, the aft portion of the shroud is made separate in the form of a sleeve which is slidably mounted on the main body of the shroud for limited axial movement. The main body terminates rearwardly in a transverse plane and the leading edge of the sleeve is formed to mate with the aft edge of the main body in substantially sealing relation when the sleeve is formed in its forward position. When stowed, the sleeve completes the streamline form of the total shroud, with its aft end in a second transverse plane.

The engine cowl is conformed to converge rearwardly from the transverse plane of the sleeve in stowed position and preferably has its maximum diameter at that plane with its forward portion converging forwardly. When the sleeve is stowed, the shroud and cowl define between them a convergent nozzle having minimum discharge area and giving optimum thrust results for cruising conditions. When the sleeve is fully deployed rearwardly, it defines with the aft portion of the shroud a divergent nozzle having maximum discharge area and giving optimum thrust results for takeoff and climb. Deployment of the sleeve produces a peripheral gap between the aft edge of the main body and the leading edge of the sleeve which is unrestricted except for a few supporting and actuating members. The gap provides a path for inflow of free stream air which is added to the mass delivered by the fan to augment the thrust and to provide a degree of noise suppression in known manner.

Beyond making the sleeve separate, the only added components are support tracks and actuating shafts. Thus, the entire modulating apparatus adds a minimum of weight and complexity, and the maintenance requirements are negligible.

BRIEF DESCRIPTION OF THE DRAWINGS

Various other advantages and features of novelty will become apparent as the description proceeds in conjunction with the accompanying drawings, in which.

DESCRIPTION OF PREFERRED EMBODIMENT

Figure 1:
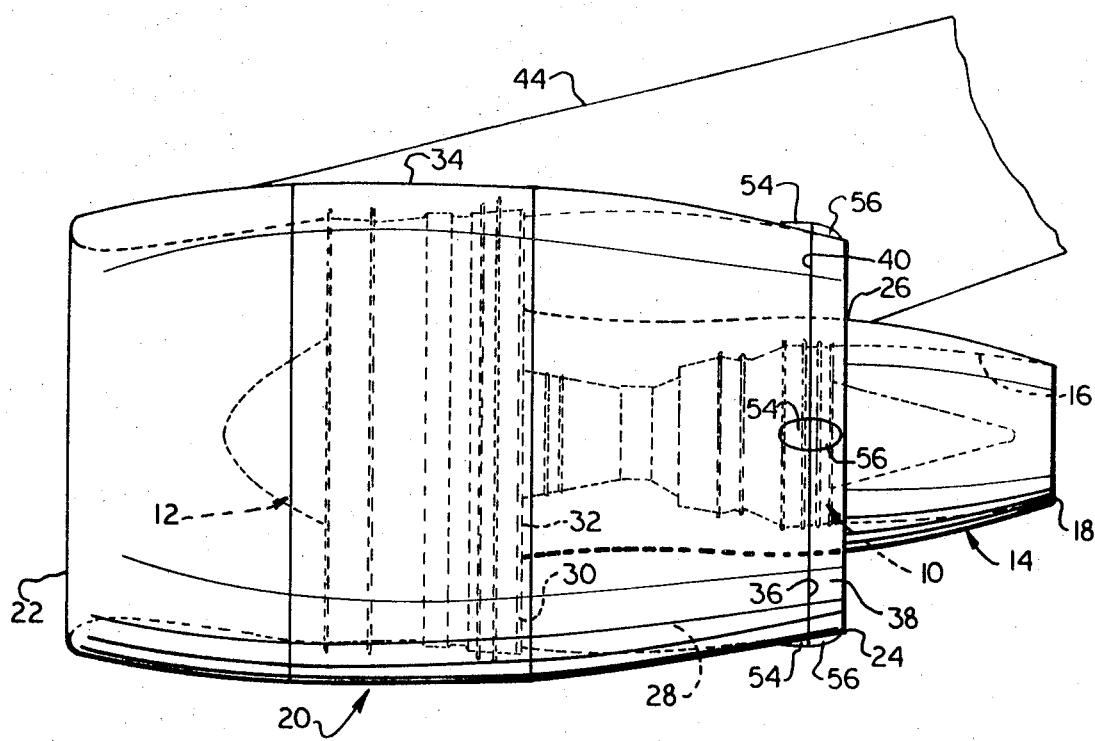
FIG. 1 is a schematic side elevational view showing a complete engine installation with the sleeve in stowed position.

The apparatus of this invention is generally schematically illustrated in FIG. 1, in which the engine 10 is provided with a fan 12. A cowl 14 terminates rearwardly in a discharging exhaust gas nozzle 16 having an exit end 18. An elongate shroud 20, which is generally coaxial with the engine, surrounds the engine and fan with its forward end 22 well ahead of the fan to constitute an air inlet and its aft edge 24 terminating forward of the exit end 18 of the turbine exhaust nozzle. The maximum diameter 26 of the engine cowl substantially coincides with the transverse plane of aft edge 24, and the cowl and shroud combine to define a convergent jet air flow passage or duct 28 for the air which is directly driven rearwardly by the radially outer portion 30 of the fan, the inner portion 32 of the fan supplying combustion air to the turbine.

The shroud actually includes two distinct sections. The larger, forward, main body 34 is fixed with respect to the engine and fan and has an aft edge 37 lying in a transverse plane. The aft section is in the form of a sleeve 38 having a leading edge 40 adapted to mate with aft edge 36 in substantially sealing relation when the sleeve is in the stowed position as shown in FIG. 1. The sleeve is slidably supported by the main body for axial movement to the deployed position indicated in solid lines in FIG. 2 to open a peripheral gap 42 which provides a passage for inflow of free stream air. The engine, cowl, and shroud are all supported on a pylon 44 which is suitably secured to a structural member of a wing or other part of an airplane.

Figure 2:
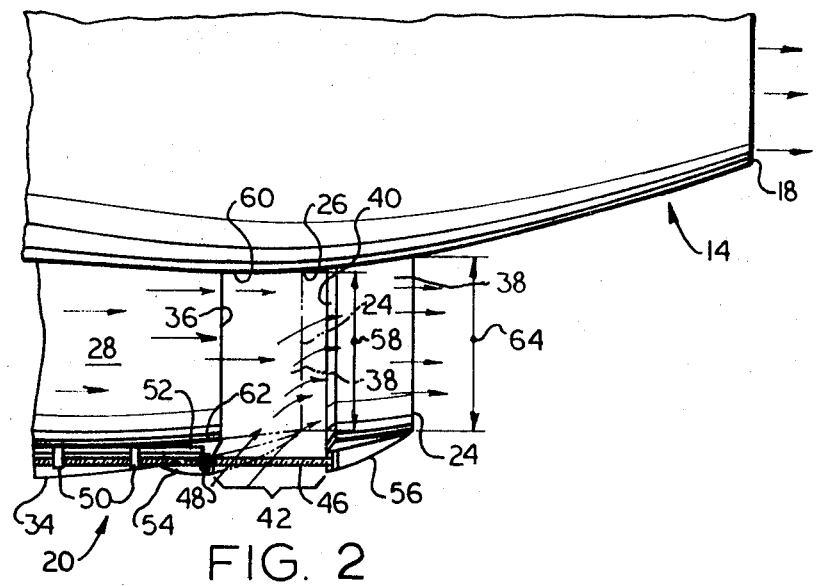
FIG. 2 is a fragmentary schematic side elevational view on an enlarged scale illustrating the operation of the principle components.

The principal components of the apparatus are illustrated in FIG. 2 with the sleeve 38 being shown in broken lines in stowed position and in solid lines in deployed position. Actuating means for moving the sleeve include a plurality of peripherally spaced threaded shafts 46, each being driven fore and aft by a rotatable ball nut 48, which in turn is driven by any suitable power means, not shown. The sleeve may be directly supported by shafts 46. In this case, the ball nuts serve as aft supports and the shafts extend forward as shown, the forward ends being provided with guide members 50 which slidably engage guide tracks 52. Fairing members 54 and 56 provide a smooth contour for cruising operation. Alternatively, separate support members and guide tracks may be provided.

It will be noted that when sleeve 38 is in stowed position, shown in broken lines, the nozzle portion forward of its trailing edge 24 is convergent and the discharge area is minimum as indicated by dimension 58. This results from the rearward convergence of sleeve 38 and the forward convergence of forward portion 60 of the cowl, as well as by the rearward convergent of the aft portion 62 of the main body 34 of the shroud. The degrees of convergence of the components are determined for the particular installation in which the apparatus is to be used to give optimum thrust performance for cruising operation.

When the sleeve is fully deployed, a distance of the order of its own chord length, as shown in solid lines, the discharge area is maximum, as indicated by dimension 64 and is a predetermined amount larger than the area indicated by 58. This area is controlled by the convergence of the sleeve and the cowl, and it will be seen that the degree of convergence of the cowl is greater than that of the sleeve. This relation also produces a divergent nozzle. Free stream air enters through gap 42 and adds its mass to the mass of the air delivered by the fan, which augments the thrust and provides a degree of noise suppression in known manner.

The entry of free stream air also produces a virtual wall around the fan stream to maintain continuity of the flow path. Since portion 62 of the main body is rearwardly convergent, it defines a convergent nozzle portion with the confronting portion of the cowl. With the continuity provided by the free stream air, the net result is a convergent-divergent nozzle profile which is the proper form for optimum thrust results during take-off and climb.

Having thus described the invention, what is claimed as new and useful and is desired to be protected by U. S. Letters Patent is: terminating

1. Modulatable thrust nozzle apparatus for use in combination with a fan type jet engine having a fan and an elongate coaxial cowl surrounding the engine and terminating in a rearwardly direction jet exhaust nozzle, comprising: an elongate shroud generally coaxial with the engine, surrounding the engine and fan and spaced outwardly of the cowl to define a generally annular passage between the cowl and shroud for rearward flow of fan air and termianting forward of the exit end of the nozzle; the shroud including a fixed forward main body having an aft edge lying in a transverse plane and an aft section in the form of an axially movable sleeve having a leading edge formed to mate with the aft edge of the main body and an aft edge lying in a transverse plane; support means on the main body to support the sleeve for said axial movement between a first, stowed, forward position in which the leading edge of the sleeve engages the aft edge of the main body in substantially sealing relation and a second, deployed, aft position in which the leading edge of the sleeve is spaced rearward of the aft edge of the main body to produce a substantially unrestricted peripheral gap for inflow of free stream air; the engine cowl converging rearwardly from the transverse plane of the aft edge of the sleeve in stowed position to define a minimum air discharge area with the stowed sleeve and a maximum air discharge area with the fully deployed sleeve.

2. Apparatus as claimed in claim 1; the inner surface of the sleeve and the portion of the engine cowl forward of the transverse plane of the aft edge of the sleeve in stowed position being so formed with respect to each other as to define a convergent nozzle with the sleeve in stowed position.

3. Apparatus as claimed in claim 1; the portion of the engine cowl forward of the transverse plane of the aft edge of the sleeve in stowed position being forwardly convergent for a predetermined distance.

4. Apparatus as claimed in claim 1; the engine cowl being generally annular in cross section and having its greatest diameter at the transverse plane of the aft end of the sleeve in stowed position, and converging forwardly and rearwardly from said plane.

5. Apparatus as claimed in claim 1; the inner surface of the sleeve being rearwardly convergent from its leading edge to its aft edge.

6. Apparatus as claimed in claim 1; the engine cowl fixedly mounted with respect to the shroud and having a fixed predetermined configuration, generally annular in cross section and having its greatest diameter at the transverse plane of the aft end of the sleeve in stowed position, and converging forwardly and rearwardly from said plane; the sleeve having a fixed annular configuration; the forward portion of the engine cowl and the sleeve in stowed position defining between them a convergent nozzle; and the aft portion of the engine cowl and the sleeve in deployed position defining between them a divergent nozzle.

7. Apparatus as claimed in claim 6; the sleeve being deployable a distance of the order of its own chord length.

8. Apparatus as claimed in claim 6; the aft portion of the main body of the shroud and the confronting portion of the engine cowl defining between them a convergent nozzle to form, with the sleeve in deployed position, a convergent-divergent nozzle profile.

* * * * *